US007778250B2

(12) United States Patent
Pang et al.

(10) Patent No.: US 7,778,250 B2
(45) Date of Patent: Aug. 17, 2010

(54) METHOD AND APPARATUS FOR SECURING A LAYER II BRIDGING SWITCH/SWITCH FOR SUBSCRIBER AGGREGATION

(75) Inventors: James Pang, Vancouver (CA); Peter Lam, Vancouver (CA)

(73) Assignee: Ericsson AB, Stockholm (SE)

( * ) Notice: Subject to any disclaimer, the term of this patent is extended or adjusted under 35 U.S.C. 154(b) by 1009 days.

(21) Appl. No.: 11/406,961

(22) Filed: Apr. 18, 2006

(65) Prior Publication Data

US 2007/0036160 A1 Feb. 15, 2007

Related U.S. Application Data

(60) Provisional application No. 60/708,122, filed on Aug. 11, 2005.

(51) Int. Cl.
*H04L 12/56* (2006.01)
*H04L 12/28* (2006.01)

(52) U.S. Cl. ................. 370/392; 370/351; 370/401

(58) Field of Classification Search ............. 370/392, 370/351, 389, 400, 401, 216, 248, 254, 431
See application file for complete search history.

(56) References Cited

U.S. PATENT DOCUMENTS 5,727,146 A * 3/1998 Savoldi et al. ............... 726/3

| | | | | |
|---|---|---|---|---|
| 5,914,953 A * | 6/1999 | Krause et al. | ................ | 370/392 |
| 6,763,023 B1 * | 7/2004 | Gleeson et al. | ............. | 370/392 |
| 6,823,453 B1 * | 11/2004 | Hagerman | ................... | 713/162 |
| 6,873,603 B1 * | 3/2005 | Ivaturi | ......................... | 370/255 |
| 7,028,179 B2 * | 4/2006 | Anderson et al. | ........... | 713/154 |
| 7,366,170 B2 * | 4/2008 | Umesawa et al. | .......... | 370/389 |
| 7,457,857 B1 * | 11/2008 | Crayford et al. | ............ | 709/223 |
| 2002/0010800 A1 * | 1/2002 | Riley et al. | .................. | 709/249 |
| 2004/0098620 A1 * | 5/2004 | Shay | ........................... | 713/201 |
| 2005/0094637 A1 * | 5/2005 | Umesawa et al. | ........... | 370/389 |
| 2006/0155853 A1 * | 7/2006 | Nesz et al. | .................... | 709/227 |
| 2007/0006293 A1 * | 1/2007 | Balakrishnan et al. | ........ | 726/13 |
| 2007/0011734 A1 * | 1/2007 | Balakrishnan et al. | ........ | 726/13 |
| 2007/0192500 A1 * | 8/2007 | Lum | ........................... | 709/230 |
| 2007/0195774 A1 * | 8/2007 | Sherman et al. | ............. | 370/392 |

* cited by examiner

*Primary Examiner*—Donald L Mills
*Assistant Examiner*—Steven Wood
(74) *Attorney, Agent, or Firm*—Blakely, Sokoloff, Taylor & Zafman LLP

(57) ABSTRACT

A method and apparatus for securing a layer II bridging switch for subscriber aggregation is described. The method receives packets from a circuit on the layer II bridging switch and makes a forwarding decision for each packet based on at least one of the addresses of the packet being currently assigned to a second circuit.

14 Claims, 12 Drawing Sheets

METHOD AND APPARATUS FOR SECURING A LAYER II BRIDGING SWITCH/SWITCH FOR SUBSCRIBER AGGREGATION

CROSS-REFERENCE TO A RELATED APPLICATIONS

This application is related to and claims the benefit of U.S. Provisional Patent application 60/708,122 filed Aug. 11, 2005, which are hereby incorporated by reference.

BACKGROUND

1. Field

Embodiments of the invention relate to the field of computer networking; and more specifically, to a layer II bridging switch for subscriber aggregation.

2. Background

A layer II (data link layer in the Open Systems Interconnection ("OSI") model) switch for subscriber aggregation, as known in the prior art, is a device used to connect multiple subscribers from one network to other network(s). The switch scans incoming data packets for the packet source and destination Media Access Control ("MAC") addresses. The switch dynamically builds a forwarding table based upon the source MAC addresses of the data packets it encounters and the ports associated with those MAC addresses. If the destination MAC address of the data packet is in the forwarding table, the packet is forwarded to the port or circuit associated with the destination MAC address. If the destination MAC address of the data packet is not in the forwarding table, the packet is forwarded to all ports except the port corresponding to the source MAC address. If the destination MAC address is the same as the source MAC address the data packet is dropped. Typically, a switch has homogeneous inputs and outputs, while a bridge is a switch that has heterogeneous inputs and outputs. A bridging switch refers to a switch that may have homogeneous or heterogeneous inputs/outputs.

FIG. 1 illustrates one embodiment of a subscriber management platform aggregating subscriber traffic with a bridge. In FIG. 1, during normal operation subscribers 102A-N connect to Internet 120 via subscriber management platform 106 and server 116. Server 116 is used by an Internet Service Provider ("ISP") to control subscriber's 102A-N access to Internet 120. By way of example and not limitation, server 116 controls subscriber's 102A-N Internet access by establishing point-to-point protocol over Ethernet (PPPoE) subscriber sessions between subscribers 102A-N and server 116. Server 116 facilitates a connection to Internet 120 for subscribers 102A-N.

In addition, subscriber management platform 106 further manages subscribers 102A-N by controlling the flow of traffic between subscribers 102A-N and server 116. Subscriber management platform 106 includes context 108 with bridge 110 for managing subscribers 102A-N traffic flow. A context is an instance of a virtual router existing within the memory of subscriber management platform 106. Although not shown, subscriber management platform 106 may include multiple contexts 108, with each context 108 used for a particular ISP or ISP access point (not shown).

Circuits 104A-N are associated with subscribers 102A-N respectively. Circuit 114A is associated with server 116. A circuit may be a variety of connections (e.g., a PPPoE session, ATM PVC VPI/VCI, VLAN, etc.). Data packets sent from subscribers 102A-N through circuits 104A-N respectively are received by bridge interface 112A coupled to bridge 110. Data packets may be forwarded from bridge 110 via bridge interface 112B to server 116 through circuit 114A. Alternatively, packets may be forwarded from bridge 110 via bridge interface 112B to backup server 118 through circuit 114A. While packets may be forwarded from subscribers 102A-N to Internet 120, packets may also be forwarded between subscribers (e.g., subscriber 102A can send packets to subscriber 102B, etc.).

FIG. 2 is a block diagram illustrating a layer II bridge and the various types of packets that are forwarded by the layer II bridge. Circuit 204A couples subscriber 202A to bridge 204. Circuit 404B couples subscriber 202B to bridge 204. Circuit 214A couples server 206 to bridge 204. Various types of packets may be forwarded by bridge 204 from subscriber 202A. Internet 208 is coupled to server 206.

It can be seen from FIG. 2 that a prior art embodiment of a layer II bridge may allow certain security problems. For example, a prior art embodiment of a layer II bridge may allow a malicious subscriber to send unwanted packets to another subscriber. This may result in a denial of service for the receiving subscriber. For example, if subscriber 202A sends large amounts of packets to subscriber 202B, subscriber 202B's network resources (such as bandwidth) may be consumed by the packets from subscriber 202A. This may effectively prevent subscriber 202B from being able to access Internet 208. An example of this is the dashed line of packet (SRC=A1, DEST=A2) which is sent from circuit 204A to circuit 204B.

Furthermore, a malicious subscriber can "spoof" the source MAC address of another subscriber. For example, if subscriber 202A modified the source MAC address of a packet from itself to match the MAC address of subscriber 202B (address A2), bridge 204 and server 206 will consider the packet to have originated from subscriber 202B. For example, packet (SRC=A2, DEST=!) sent from subscriber 202A will spoof the address of subscriber 202B. If subscriber 202B subscribes to a service that charges by the byte or by the amount of connection time, subscriber 202A would be effectively charging the account of subscriber 202B by spoofing the address of subscriber 202B. Furthermore, spoofing another subscriber's MAC address can hide other malicious actions such as sending viruses, launching denial of service attacks, deny services for the spoofed MAC address, etc.

In addition to spoofing a subscriber's MAC address, a malicious subscriber can also spoof the MAC address of a server. For example, if subscriber 202A modified the source MAC address of a packet from itself to match the MAC address of server 206 (address A3), bridge 204 will consider the packet to have originated from server 206. For instance, packet (SRC=A3, DEST=!) sent from subscriber 202A will spoof the address of server 206. Bridge 204 will believe that server 206 has changed the circuit it uses, and will update the bridge table to reflect this. Thus, traffic intended for server 206 may be forwarded to subscriber 202A.

BRIEF SUMMARY

A method and apparatus for securing a layer II bridge for subscriber aggregation is described. The method includes receiving packets from a circuit on the layer II bridge and making a forwarding decision for the packet based on at least one of the addresses of the packet being currently assigned to a second circuit.

BRIEF DESCRIPTION OF THE DRAWINGS

Embodiments of the invention may be best understood by referring to the following description and accompanying drawings which illustrate such embodiments. The numbering scheme for the Figures included herein is such that the leading number for a given element in a Figure is associated with the number of the Figure. For example, bridge 110 can be located in FIG. 1. However, element numbers are the same for those elements that are the same across different Figures. In the drawings.

DETAILED DESCRIPTION

Figure 1:
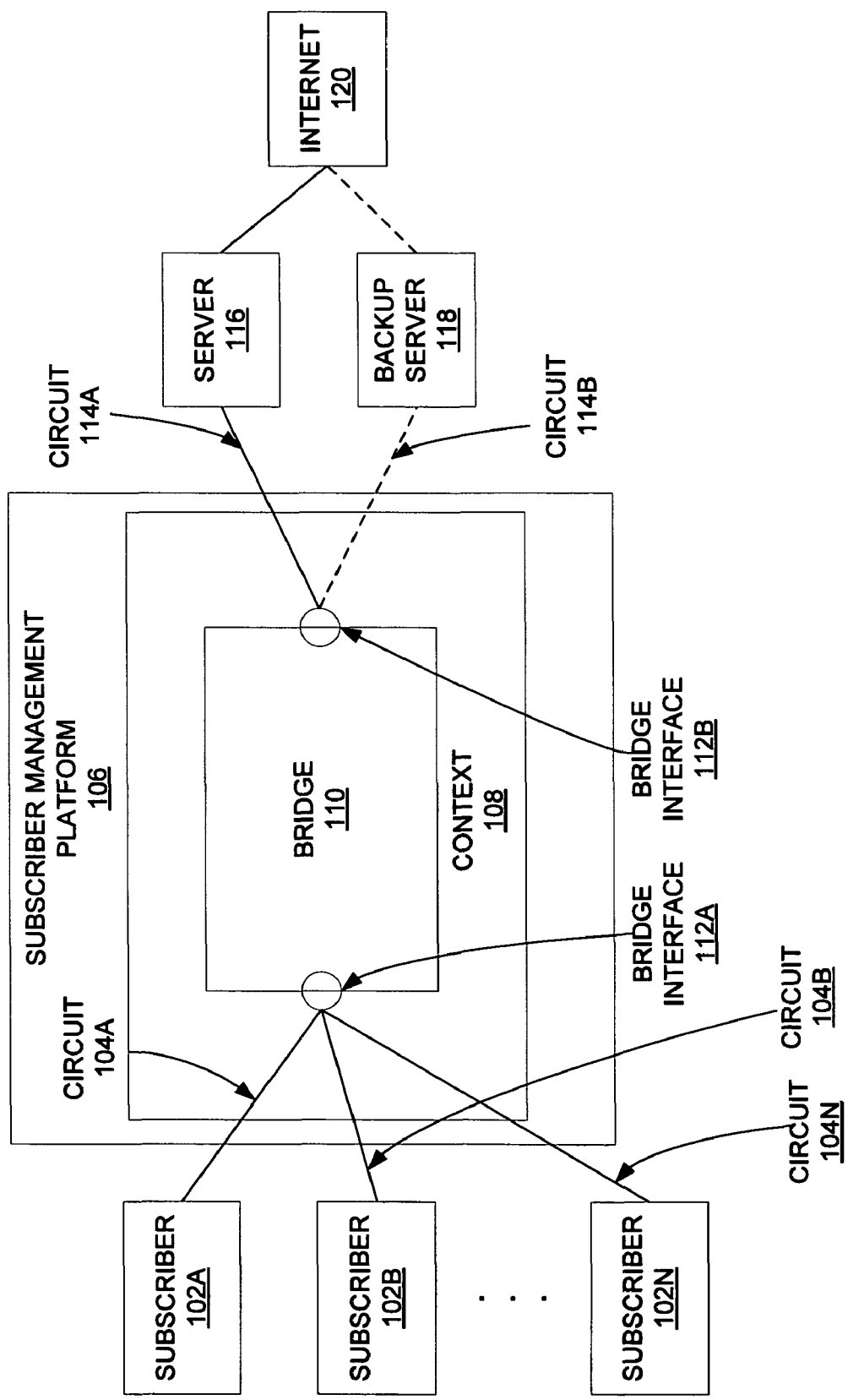
FIG. 1 (Prior Art) illustrates one embodiment of a subscriber management platform aggregating subscriber traffic with a bridging switch.
Figure 2:
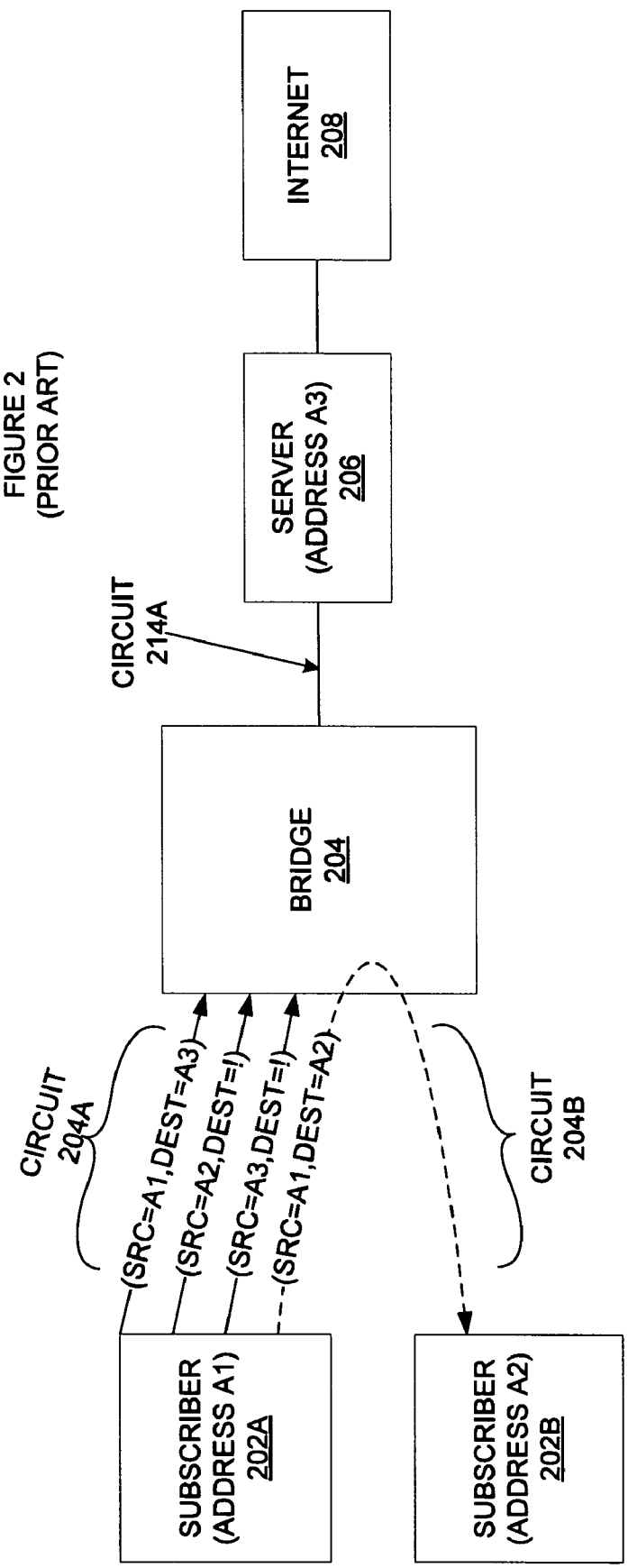
FIG. 2 (Prior Art) is a block diagram the types of packets that are forwarded by a bridging switch.

In the following description, numerous specific details such as bridge forwarding table, circuit attribute table, circuit, packet, processor card, line card, and interrelationships of system components are set forth in order to provide a more thorough understanding of the invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the term "coupled," along with its derivatives, is used. "Coupled" may mean that two or more elements are in direct physical or electrical contact. However, "coupled" may also mean that two or more elements are not in direct contact with each other, but yet still co-operate or interact with each other.

In the following description and claims, the term "subscriber," along with its derivatives, is used. "Subscriber" may refer to an individual who subscribes to a service, a business that subscribes to a service, a computing device of an individual, or a computing device of a business.

In the following description and claims, the term "addresses," along with its derivatives, is used. The term "addresses" includes source and destination addresses of a packet. In one embodiment of the invention these addresses are based on the Media Access Control ("MAC") address of a subscriber's computing device.

Exemplary embodiments of the invention will now be described with reference to FIGS. 3-10. In particular, the operations of the flow diagrams in FIGS. 5-8 will be described with reference to the exemplary embodiments of FIGS. 3-4. However, it should be understood that the operations of these flow diagrams can be performed by embodiments of the invention other than those discussed with reference to FIGS. 3-4, and that the embodiments discussed with reference to FIGS. 3-4 can perform operations different than those discussed with reference to these flow diagrams.

A method and apparatus for securing a layer II bridging switch for subscriber aggregation is described below. According to one embodiment of the invention, the layer II bridging switch may offer a relatively higher level of security for the purpose of aggregating subscriber traffic which is untrusted in nature. According to one embodiment of the invention, the layer II bridging switch may prevent spoofing, hijacking, and certain denial of service attacks.

Figure 3:
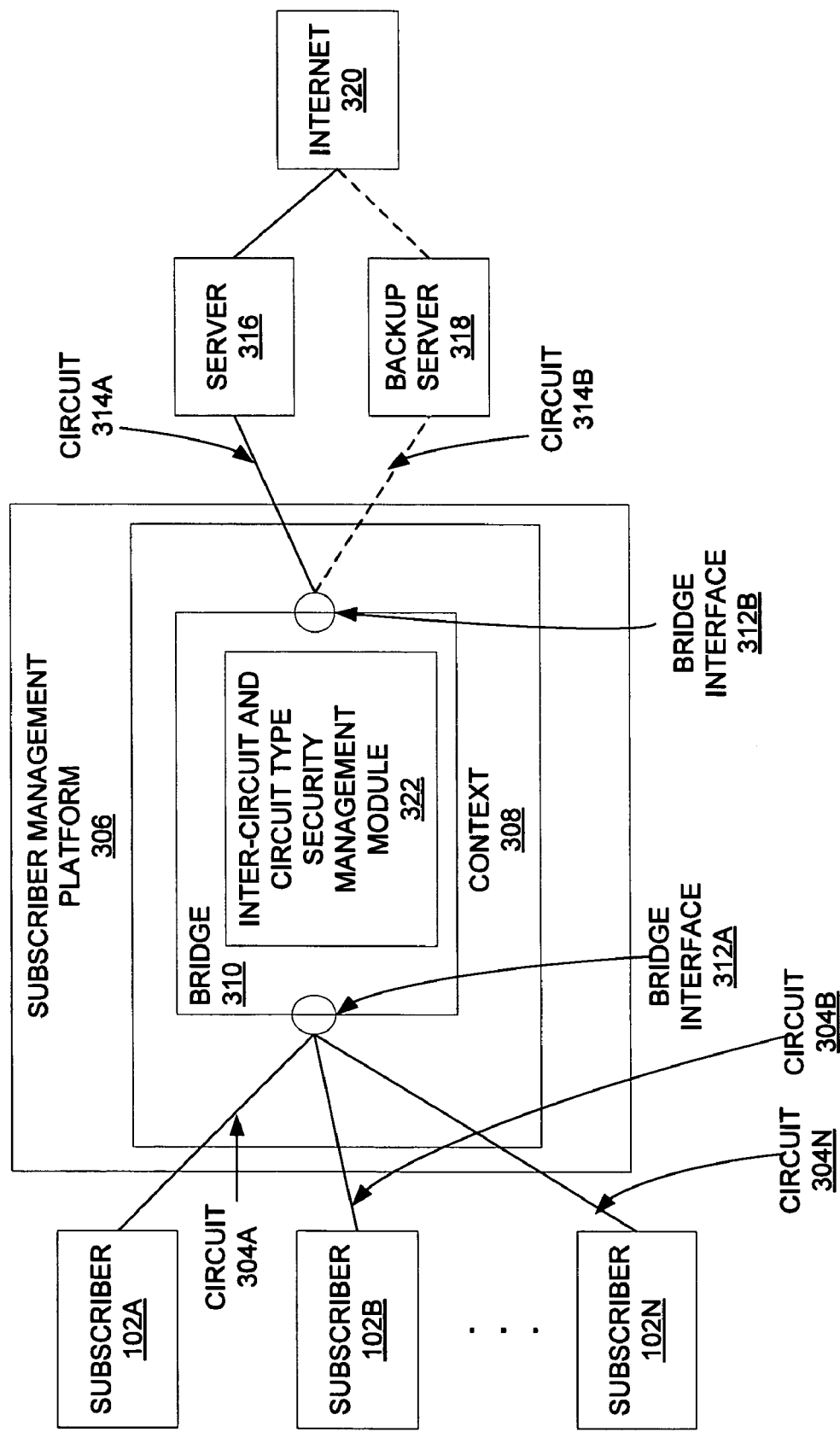
FIG. 3 illustrates one embodiment of a subscriber management platform aggregating subscriber traffic with an inter-circuit and circuit type security management module 322 according to one embodiment of the invention.

FIG. 3 illustrates one embodiment of a subscriber management platform aggregating subscriber traffic over a secure layer II bridging switch according to one embodiment of the invention. Subscriber management platform 306 includes context 308, which is coupled with server 316 and an optional backup server 318. Although not shown, subscriber management platform 306 may instantiate multiple contexts 308 and one or more bridging switchs per context. While in one embodiment of the invention the bridging switch is in a context of a subscriber management platform, in alternative embodiments of the invention the bridging switch may be deployed differently (e.g., the bridging switch may be outside in a standalone device, part of a subscriber management platform that does not support multiple contexts and/or that support only a single bridging switch per context, part of a different type of network element that does or does not support multiple bridging switches, etc.)

Bridging switch 310 includes bridge interfaces 312A-B and inter-circuit and circuit type security management module 322. While it is understood that interfaces may be bidirectional, in this description embodiments of the invention will be described with reference to bridge interface 312A receiving packets from subscribers 302A-N, and bridge interface 312B transmitting packets, in order not to confuse the understanding of the invention. While two interfaces are shown in FIG. 3, it is understood that some embodiments of the invention may support additional interfaces.

Circuits 304A-N couple bridging switch 310 to subscribers 302A-N, respectively. Circuits 314A-B couple bridging switch 310 to server 316 and an optional backup server 318, respectively. Server 316 and backup server 318 couple with Internet 320. Within bridging switch 310, each circuit may be designated as being of different types; for example, in one embodiment, circuit types include trusted and untrusted, where trusted circuits may have fewer restrictions than untrusted circuits. In addition, in some embodiments of the invention the circuit types may also include restricted and unrestricted. Therefore the type of circuit may take a variety of forms depending on the implementation (e.g. trusted non-restricted, trusted restricted, untrusted non-restricted, untrusted restricted, etc.). While any circuit may be designated to be of a given circuit type, e.g., trusted or untrusted, in one embodiment of the invention, circuits facing the subscribers are referred to as Subscriber Facing ("SbF") and are designated as untrusted, and circuits facing the service providers are referred to as Service Provider Facing ("SpF") and are designated as trusted. While in one embodiment of the invention subscribers' devices are coupled to a SbF circuit and a server is coupled to a SpF circuit, other embodiments of the invention may include subscribers' device(s) being coupled to a SpF circuit and/or a server being coupled to a SbF circuit. Also, while in one embodiment of the invention, SpF circuits are designated as trusted and SbF circuits are designated as untrusted, other embodiments of the invention include SpF circuits designated as untrusted and/or SbF circuits designated as trusted.

Inter-circuit and circuit type security management module 322 manages packets and makes forwarding decisions for packets received by bridging switch 310. According to one embodiment of the invention, inter-circuit and circuit type security management module 322 bases the forwarding decision for a packet on match(es) between the addresses of the packet and the addresses currently assigned to other circuits and types of those circuits. The possible forwarding decision may take a variety of forms depending on the implementation (e.g., determining to drop the packet, to forward the packet directly, to redirect the forwarding, etc.). The different types of circuits and their importance to inter-circuit and circuit type security management module 322 will be described with more detail below.

Figure 4:
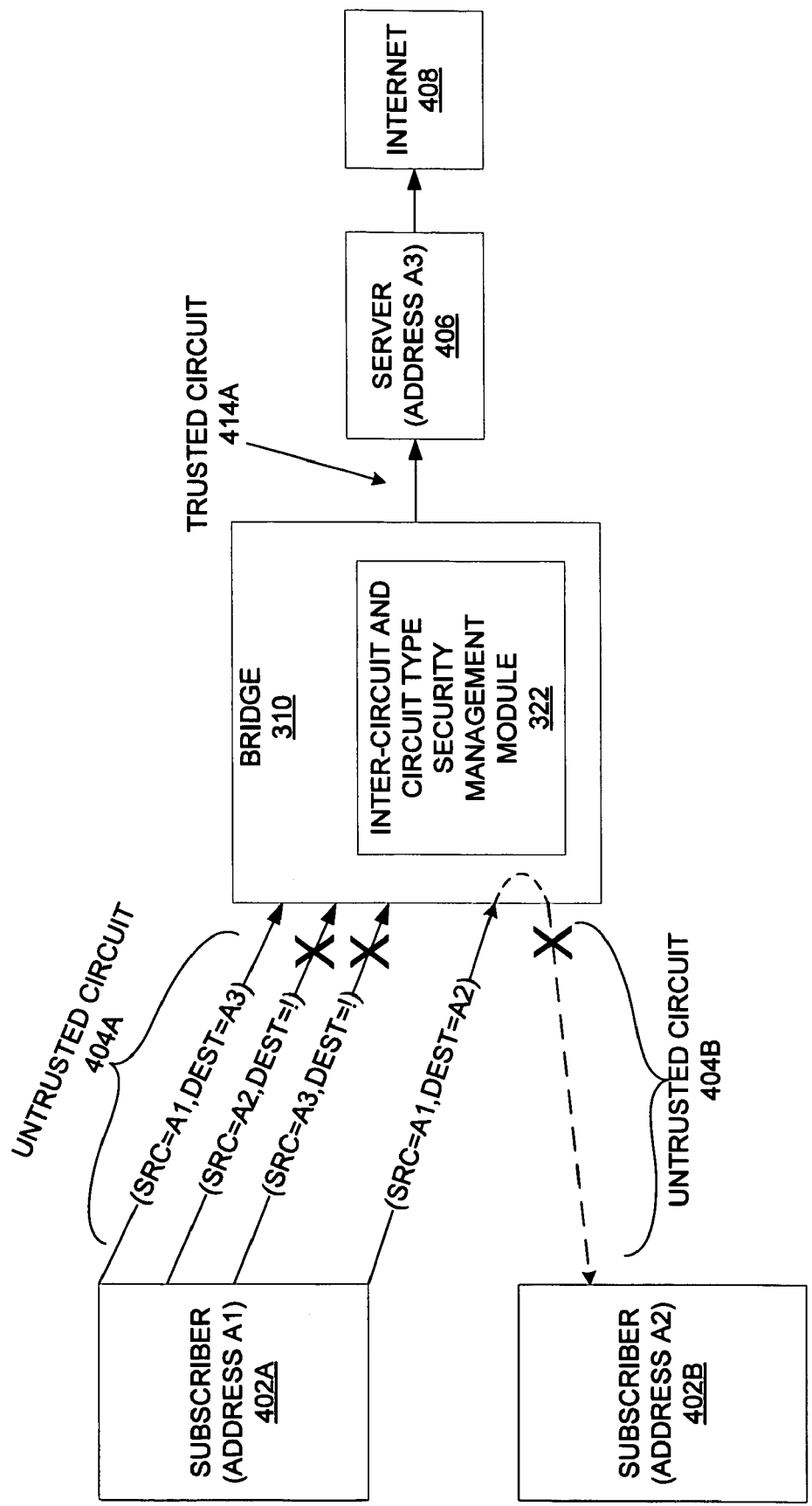
FIG. 4 is a block diagram illustrating additional security features of a layer II bridging switch.

FIG. 4 is a block diagram illustrating security features for a layer II bridging switch, one or more of which may be implemented by inter-circuit and circuit type security management module 322 of FIG. 3, according to one embodiment of the invention. Subscriber 402A (address A1) is coupled to bridging switch 310 by untrusted circuit 404A. Subscriber 402B (address A2) is coupled to bridging switch 310 by untrusted circuit 404B. Trusted circuit 414A couples bridging switch 310 to server 406 (address A3). In one typical deployment, Internet 408 may include one or more devices coupled to trusted circuit 414A and may include one or more devices not coupled to trusted circuit 414A. Although in FIG. 4 untrusted circuits 404A-B each are coupled to a single subscriber (subscriber 402A-B, respectively), there may be multiple subscribers or multiple subscribers' devices coupled to an untrusted circuit.

Inter-circuit and circuit type security management module 322 aims to prevent various types of security problems by adding security features to a layer II bridging switch. While in one embodiment of the invention, inter-circuit and circuit type security management module 322 aims to prevent devices coupled to untrusted circuits from spoofing the address of devices (e.g., servers) coupled to trusted circuits, aims to prevent devices coupled to untrusted circuits from spoofing the address of devices coupled to other untrusted circuits, and aims to prevent packets from untrusted circuits to be forwarded directly to other untrusted circuits; other embodiments of the invention may include less, more, and/or different security features.

According to one embodiment of the invention, inter-circuit and circuit type security management module 322 adds security features to a layer II bridging switch that aim to prevent devices coupled to untrusted circuits from spoofing the addresses of devices coupled to a trusted circuit. For instance, this security feature prevents malicious subscribers from spoofing the address of servers. For example in FIG. 4, subscriber 402A (address A1) attempts to send a packet using the address of server 406 (address A3) to any destination, represented by (SRC=A3, DEST=!). Inter-circuit and circuit type security management module 322 receives this packet and determines to drop the packet because inter-circuit and circuit type security management module 322 does not allow a device coupled to a trusted circuit to change its address that is assigned to an untrusted circuit. In other words, a packet from an untrusted circuit will be dropped by inter-circuit and circuit type security management module 322 if the source address of that packet is assigned to a trusted circuit. In FIG. 4, packet (SRC=A3,DEST=!) is marked with a large "X" to represent that this packet will not be forwarded beyond bridging switch 310.

In addition, inter-circuit and circuit type security management module 322 adds security features to a layer II bridging switch by aiming to prevent devices coupled to untrusted circuits from spoofing other devices coupled to untrusted circuits. For instance, this security feature may prevent malicious subscribers from spoofing other subscribers' addresses. For example in FIG. 4, subscriber 402A (address A1) sends packet (SRC=A2, DEST=!) that is attempting to spoof the address of subscriber 402B (address A2). Inter-circuit and circuit type security management module 322 receives this packet and determines to drop the packet, represented by the large "X" on the line of (SRC=A2, DEST=!) in FIG. 4. This example is not meant as limitation, as an untrusted circuit may change the address assigned to it if certain conditions are met, which will be explained in greater detail with reference to FIG. 5B.

Inter-circuit and circuit type security management module 322 also adds security features to a layer II bridging switch by aiming to prevent forwarding packets from an untrusted circuit to another untrusted circuit without first being forwarded to a device coupled to a trusted circuit. For example in FIG. 4, subscriber 402A (address A1) sends a packet to subscriber 402B (both subscribers are coupled to untrusted circuits), represented by (SRC=A1, DEST=A2). The dashed line of (SRC=A1, DEST=A2) represents attempted forwarding from untrusted circuit 404A to untrusted circuit 404B. Inter-circuit and circuit type security management module 322 receives packet (SRC=A1, DEST=A2) and forwards the packet towards server 406 (for authentication, billing, security validation, etc.) before it is forwarded towards subscriber 402B (address A2). In alternative embodiments of the invention, the packet may be forwarded on a trusted circuit towards other devices coupled to the trusted circuit, multiple devices coupled to the trusted circuit, all devices coupled to the trusted circuit, or to other modules within a subscriber management platform, before being forwarded to subscriber 402B. The large "X" on the dashed line of (SRC=A1, DEST=A2) represents that the packet will not be forwarded to subscriber 402B without first being forwarded to a device coupled to a trusted circuit.

Similarly, flood (e.g., broadcast) and multicast packets from an untrusted circuit are not forwarded to other untrusted circuits without first being forwarded to a device coupled to a trusted circuit. According to one embodiment of the invention, upon receiving a multicast and/or flood packet, inter-circuit and circuit type security management module 322 will forward this packet to all trusted circuits coupled to the bridging switch.

In contrast, inter-circuit and circuit type security management module 322 forwards packets from untrusted circuits to trusted circuits when the packet source address is assigned to the untrusted circuit and the packet destination address is assigned to the trusted circuit. For example in FIG. 4, subscriber 402A (address A1) sends packet (SRC=A1, DEST=A3) to server 406 (address A3). Inter-circuit and circuit type security management module 322 receives this packet and determines that the packet is from untrusted circuit 404A, source address A1 is assigned to untrusted circuit 404A, and destination address A3 is assigned to trusted circuit 414A. Therefore, inter-circuit and circuit type security management module 322 forwards this packet on a circuit towards server 406 (address A3). While it is understood that the destination may be a server, other embodiments of the invention describe the destination to be any device which is coupled to a trusted circuit. For example, the destination may be devices within Internet 408.

Figure 5A:
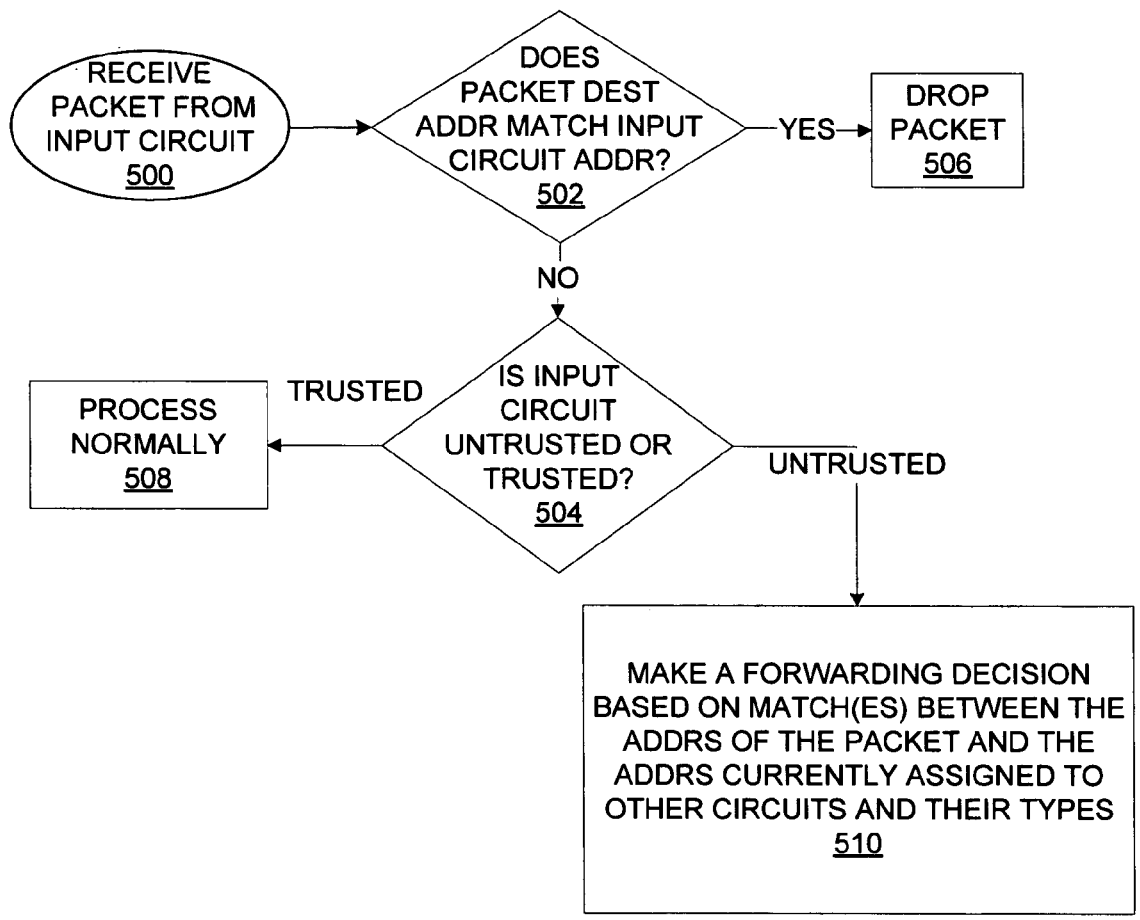
FIGS. 5A-B are exemplary flow diagrams for forwarding packets based upon the addresses of the packet and the circuit types.

FIG. 5A is an exemplary flow diagram of a method for forwarding decisions for a packet according to one embodiment of the invention. At 500, a packet is received from a circuit, which is known as the input circuit. The input circuit may be either a SbF circuit or a SpF circuit, with various attributes (e.g. trusted non-restricted, trusted restricted, untrusted non-restricted, untrusted restricted, etc.). The input circuit has an address assigned to it (referred to as the input circuit address), which may or may not match the source address. Control is passed from 500 to block 502.

At block 502, a determination is made whether the destination address of the packet matches the address currently assigned to the input circuit (input circuit address). If the addresses match, the packet is dropped at 506 as the circuit is attempting to forward a packet to itself. If the addresses do not match, control moves to 504.

At block 504 a determination is made whether the input circuit is untrusted or trusted. If the input circuit is trusted, control moves to block 508 where the packet will be processed normally. Processing normally means enforcing the prior art layer II bridging switch rules (see background) according to one embodiment of the invention. If the input circuit is untrusted, control moves to block 510.

At block 510 a forwarding decision for the packet is made based on match(es) between the addresses of the packet and the addresses currently assigned to other circuits and their types. The possible forwarding decision may take a variety of forms depending on the implementation (e.g., determining to drop the packet, to forward the packet directly, to redirect the forwarding, etc.).

Figure 5B:
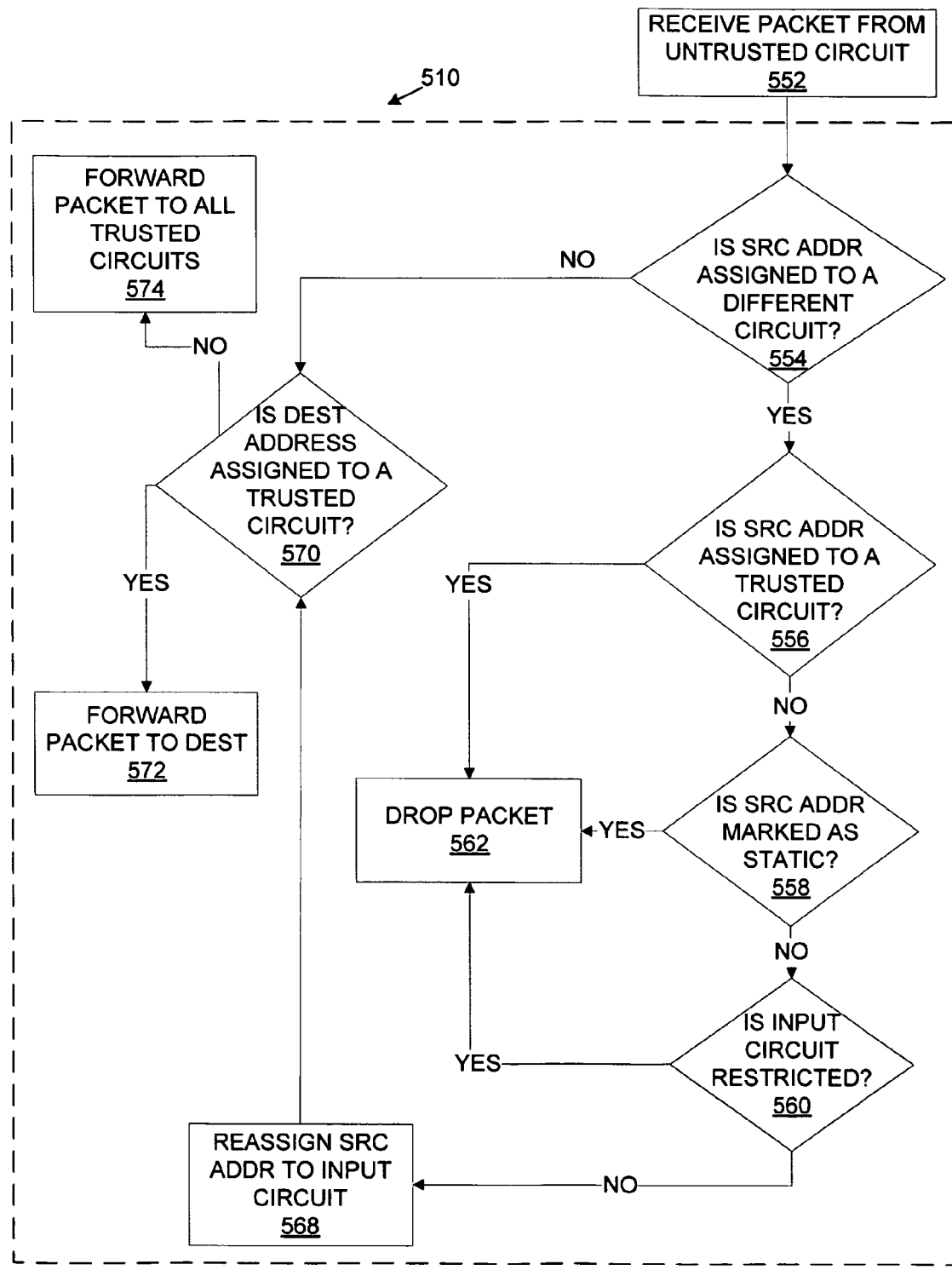

FIG. 5B is a more detailed block diagram of 510 according to one embodiment of the invention. A packet is received from an input untrusted circuit at block 552. At block 554 a determination is made whether the source address of the packet is assigned to a different circuit. A source address that is assigned to a different circuit may possible indicate a spoofing attempt. If the source address is assigned to a different circuit, control moves to 556. If the source address is not assigned to a different circuit, control moves to 570.

At 570, a determination is made whether the destination address of the packet is assigned to a trusted circuit. If a packet is processed at block 570, spoofing source addresses is not a concern, because the packet's source address is known to the input circuit. Instead, the destination address of the packet is examined to prevent a layer II bridging switch from forwarding packets from untrusted circuits to other untrusted circuits, according to one embodiment of the invention. If the destination address is assigned to a trusted circuit, the packet is forwarded to its destination at block 572. If the destination is not assigned to a trusted circuit, control flows to block 574 and the packet is forwarded to all the trusted circuits using the flooding algorithm described in FIG. 6B, at block 628.

At block 556, a determination is made whether the packet's source address is assigned to a trusted circuit. As previously discussed, an address assigned to a trusted circuit is not allowed to be moved to an untrusted circuit. For instance, this prevents a subscriber from spoofing the address of a server. If the source address is assigned to a trusted circuit, the packet is dropped at 562, thus preventing the untrusted circuit from spoofing the address of the trusted circuit. If the source address is not assigned to a trusted circuit (hence assigned to an untrusted circuit), control flows to 558.

At block 558, a determination is made whether the packet's source address is marked as static. An address will be marked as static if the address is manually configured as belonging to a particular circuit. An address may be marked as dynamic if the address is learned by the bridging switch. A bridging switch learns an address by associating the address with a particular circuit. If the source address is marked as static, the packet is dropped at 562. If the source address is not marked as static, control flows to 560.

At 560, a determination is made whether the input circuit is restricted. Circuits that are restricted can only source packets with addresses statically assigned to them. If the input circuit is restricted, the packet is dropped 562. This prevents unauthorized stations to send traffic (packets) to the subscriber aggregation bridging switch on such circuits. If the input circuit is not restricted, control flows to block 568.

At block 568, the source address is reassigned to the input circuit. This allows an untrusted circuit the ability to change the address that is assigned to it. According to one embodiment of the invention, reassignment includes deleting the source address from the circuit that currently has the source address assigned to it, and assigning the source address to the input circuit. After the reassignment, control flows to block 570, which is described above.

While in one embodiment of the invention, addresses are in a single BFT per bridging switch instance, other embodiment of the invention may describe addresses in multiple (circuit-specific BFTs. In particular, in one alternate embodiment there would be one BFT for each untrusted input circuit, and a single BFT to be shared by all trusted input circuits. In this embodiment, the BFT for the trusted circuits consists of all circuits. On the other hand, for each untrusted circuit, the BFT consists of the untrusted circuit and all the trusted circuits. By using this embodiment, block 570 is not needed, because each untrusted BFT would only contain untrusted MACs for a single untrusted circuit.

Figure 6A:
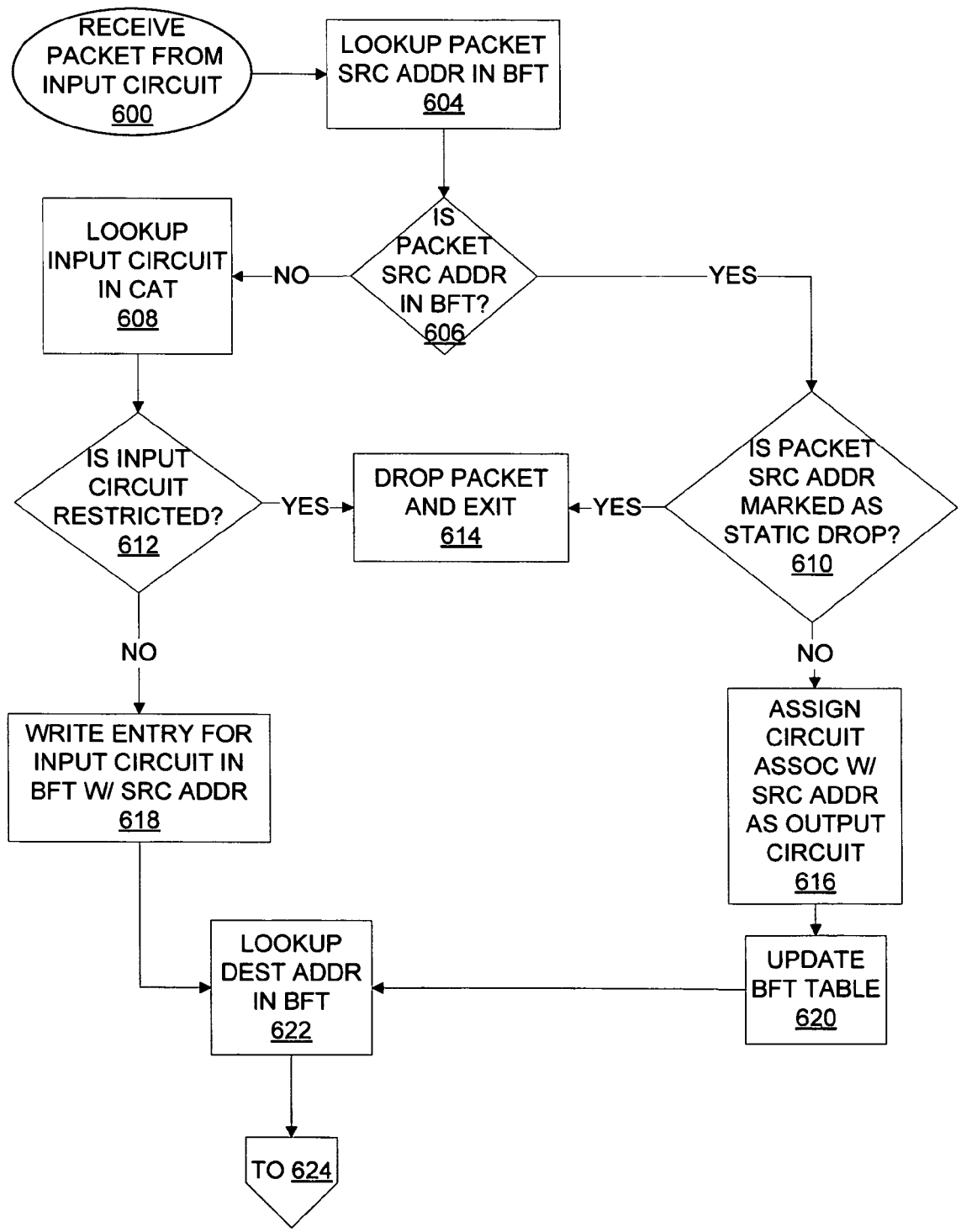
FIGS. 6A-B are exemplary flow diagrams for enhancing security of a bridging switch by using a Circuit Attribute Table and a Bridge Forwarding Table, according to one embodiment of the invention.
Figure 6B:
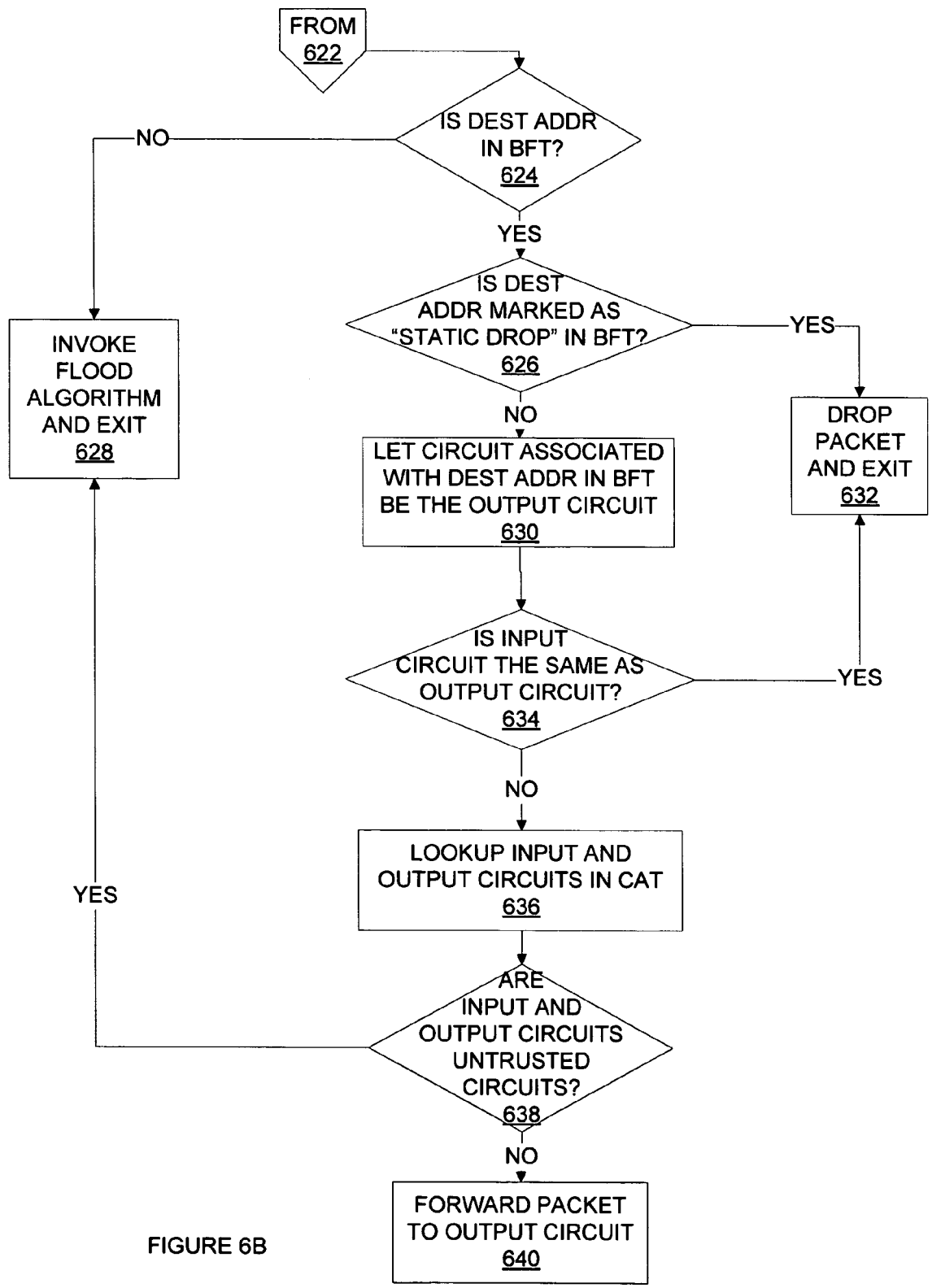

FIGS. 6A-B illustrate an alternative flow diagram that incorporates additional security features into a typical packet processing flow of a layer II bridging switch according to one embodiment of the invention. FIGS. 6A-B perform similar operations as in FIGS. 5A-B, with the addition that FIGS. 6A-B add security features that allow addresses to be marked as static drop, which will be explained in greater detail below.

After a packet is received from an input circuit at block 600, the packet's source address is looked up in a Bridge Forwarding Table ("BFT") at block 604. While in one embodiment of the invention source addresses are in a table, other embodiments of the invention describe source addresses implemented in other data structures (e.g., linked lists, trees, arrays, etc.). At block 606, the packet source address is determined to be in the BFT. If the source address is in the BFT, control moves to 610. If the source address is not in the BFT, control moves to 608. While in one embodiment of the invention, source addresses are stored in a table, other embodiments of the invention may describe source addresses stored in other data structures (linked lists, arrays, vectors, etc.).

At block 608, the input circuit is looked up in a Circuit Attribute Table ("CAT"). While in one embodiment of the invention circuit attributes are stored in a table, other embodiments of the invention describe circuit attributes implemented in other data structures (e.g., linked lists, trees, arrays, etc.). After the input circuit is found in the CAT, a determination is made whether the input circuit is restricted at block 612. If the input circuit is restricted, the packet is dropped at 614. If the input circuit is not restricted, control flows to block 618.

At block 618, an entry for the input circuit is written in the BFT with the source address. In other words, the source address is entered into the BFT according to the input circuit. Control then flows to block 622 where the destination address is looked up in the BFT. Control then flows to block 624.

At block 610, a determination is made whether the source address is marked as static drop. If the address is marked as static drop, the packet will be dropped at 614. There may be one or more addresses that are marked as static drop. While in one embodiment of the invention a special circuit, called a "null circuit" in the BFT, is associated with static drop source addresses, other embodiments of the invention describe a different data structure to store static drop source addresses. If the source address is not marked as static drop, control flows to block 616 where the circuit associated with the source address is referred to as the "known" circuit. Control flow moves to 620 where the BFT table is updated, and then control flow moves to 622. Block 620 will be described in greater detail in FIG. 7.

At block 624 in FIG. 6B, a determination is made whether the destination address is in the BFT. If the destination address is not in the BFT (hence is unknown), a flood algorithm is invoked at 628 which will be described in greater detail in FIG. 8. If the destination address is in the BFT, control flows to block 626. Alternately, for the embodiment described above that has multiple per circuit BFTs, controls flow in both cases to block 638 because each untrusted BFT would only contain the untrusted MACs for a single untrusted circuit.

At block 626, a determination is made whether the destination address is marked as static drop in the BFT. While in one embodiment of the invention a special circuit, called a "null circuit" in the BFT, is associated with static drop destination addresses, other embodiments of the invention describe a different data structure to store static drop destination addresses (e.g., a data structure that stores addresses to drop on a source, destination or per-circuit basis). Similar to source addresses that are marked as static drop, packets with destination addresses that are marked as static drop will be dropped at 632. If the destination address is not marked as static drop in the BFT, control flows to 630 where the circuit that is associated with the destination address is referred to as the output circuit, and control flow moves to block 634.

At block 634, a determination is made whether the input circuit is the same as the output circuit. If the input circuit is the same as the output circuit, the packet is dropped at 632 because a packet cannot be sent and delivered to the same circuit. If the input circuit is not the same as the output circuit, the input circuit and the output circuit are looked up in the CAT at 636 and control flows to 638.

At block 638, a determination is made whether the input and output circuits are both untrusted circuits. If they are both untrusted circuits, a flood algorithm is invoked at block 628. These two steps prevent packets from being forwarded from an untrusted circuit to another untrusted circuit. As an example, packet (SRC=A1, DEST=A2) in FIG. 4 will not be forwarded from untrusted circuit 404A to untrusted circuit 404B without first being forwarded to trusted circuit 414A. If the two circuits are not both untrusted circuits, the packet is forwarded to the output circuit at block 640.

Figure 7:
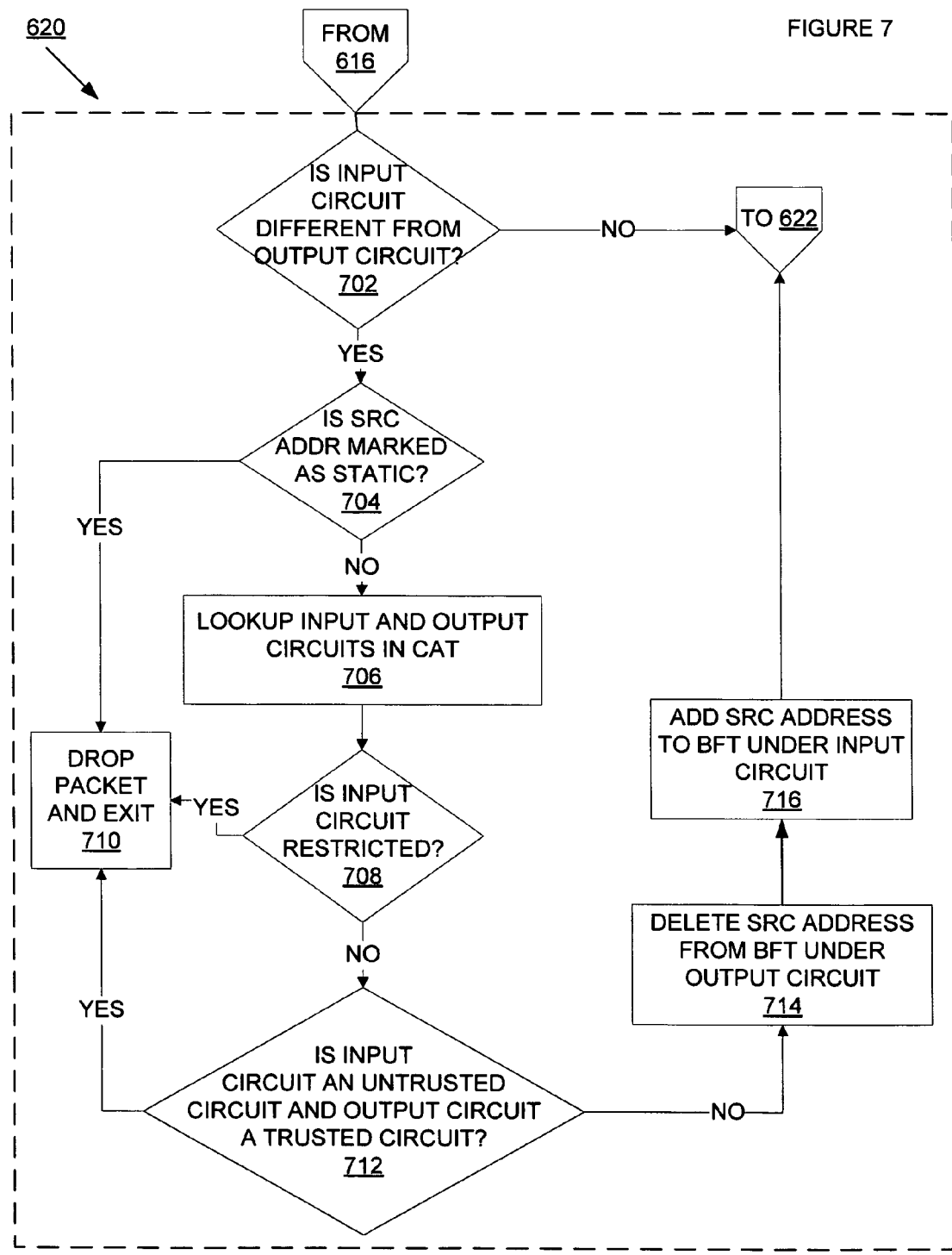
FIG. 7 is an exemplary flow diagram for updating the Bridge Forwarding Table, according to one embodiment of the invention.

FIG. 7 is a more detailed flow diagram describing updating the BFT table, according to one embodiment of the invention. At block 702, a determination is made whether the input circuit is different from the output circuit. If the input circuit is not different from the output circuit, control flows to 622. If the input circuit is different from the output circuit, control flows to block 704.

At block 704, a determination is made whether the source address is marked as static. As mentioned above, an address will be marked as static if the address is manually configured as belonging to a particular circuit. The system will not automatically move an address that is marked as static to a different location (circuit). If the source address is marked as static, the packet will be dropped at 710, since the address marked as static cannot be re-assigned from the known circuit to the input circuit. If the source address is not marked as static, the input circuit and known circuit are looked up in the CAT at 706 and flow moves to block 708.

At block 708, a determination is made whether the input circuit is restricted. As mentioned above, restricted circuits can only source packets with addresses statically assigned to them. Furthermore, they are not allowed to "learn" new addresses. If the input circuit is restricted, and if the source address of the incoming packet is not one of the static addresses assigned to this circuit, the packet is dropped at 710. If the input circuit is not restricted, control flow moves to 712.

At block 712, a determination is made whether the input circuit is an untrusted circuit and the output circuit is a trusted circuit. If the input circuit is untrusted and the output circuit is trusted, the packet is dropped at 710 as a trusted circuit cannot move its address to an untrusted circuit. This prevents an untrusted circuit from spoofing an address assigned to a trusted circuit. For example in FIG. 4, packet (SRC=A3, DEST=!) is dropped as a packet from an untrusted circuit is attempting to spoof an address assigned to a trusted circuit. If the input circuit is untrusted and the output circuit is untrusted, or the input circuit is trusted and the output circuit is trusted, control flows to block 714. At block 714, the source address that was assigned to the output circuit in the BFT is deleted and at block 716, the source address is assigned to the input circuit in the BFT. Control flow then moves to block 622.

Figure 8:
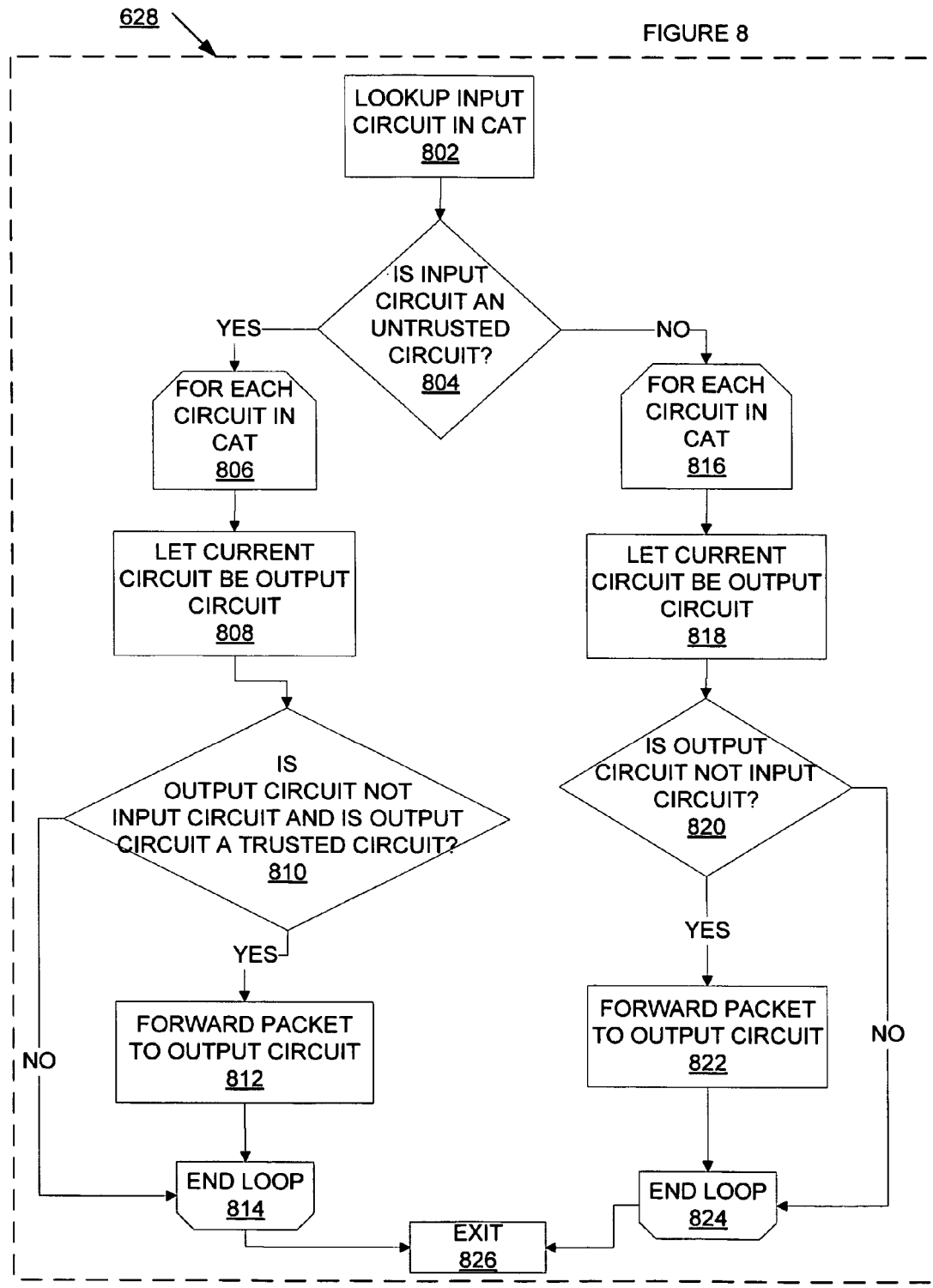
FIG. 8 is an exemplary flow diagram for handling flood traffic according to one embodiment of the invention.

FIG. 8 is a flow diagram providing more detail to the flood algorithm of block 628, according to one embodiment of the invention. The flood algorithm is used when the destination address is unknown and/or the input and output circuits are both untrusted circuits, according to one embodiment of the invention. At block 802, the input circuit is looked up on the CAT. Control flows to block 804 where a determination is made whether the input circuit is untrusted. If the input circuit is untrusted, control flows to block 806. If the input circuit is trusted, control flows to block 816.

At block 816, for each circuit that is in the CAT, the current circuit is the output circuit at block 818. At block 820, a determination is made whether the output circuit is not the same as the input circuit. If they are not the same, at block 822 the packet is forwarded to the output circuit and the loop ends at block 824. If they are the same, the packet is not forwarded and if there are no more circuits in the CAT, the loop ends at 824, and exits at 826. In other words, blocks 816-824 forward the packet to every circuit, except for the input circuit.

At block 806, for each circuit that is in the CAT, the current circuit is the output circuit. At block 810, a determination is made whether the output circuit is not the input circuit and is the output circuit a trusted circuit. If the output circuit is not the input circuit and the output circuit is a trusted circuit, control flow moves to block 812 where the packet is forwarded to the output circuit. If the output circuit is the input circuit or the output circuit is an untrusted circuit, control flow moves to block 814 where the loop ends. In other words, blocks 806-814 forward the packet to every trusted circuit.

Figure 9:
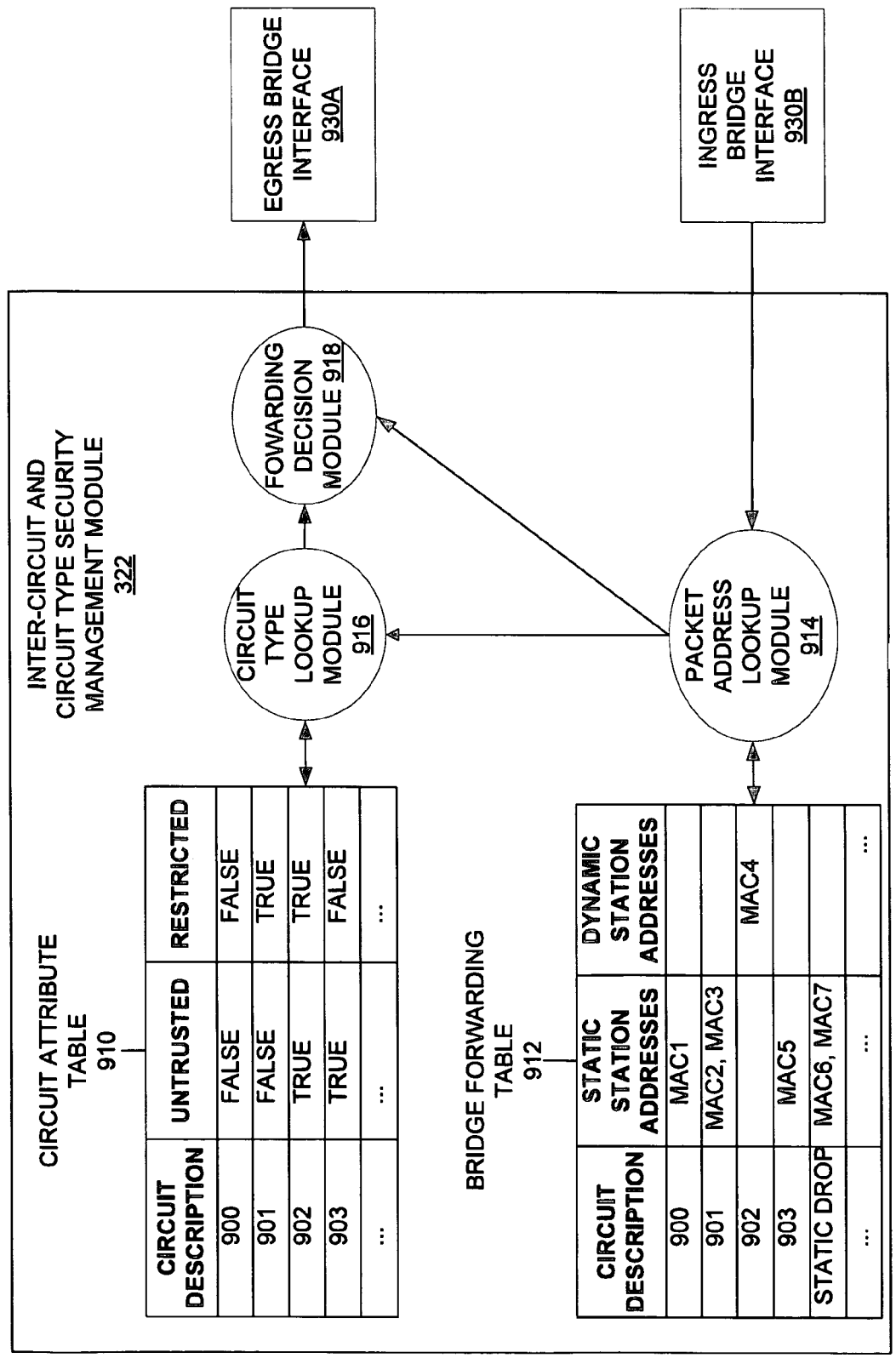
FIG. 9 is a block diagram illustrating a subscriber management platform incorporating a bridging switch, according to one embodiment of the invention.

FIG. 9 is an exemplary block diagram of one implementation of inter-circuit and circuit type security management module 322 according to one embodiment of the invention. Inter-circuit and circuit type security management module 322 includes circuit attribute table 910, bridge forwarding table 912, circuit type lookup module 916, forwarding decision module 918, and packet address lookup module 914. While in one embodiment of the invention bridge forwarding table 912 and circuit attribute table 910 are implemented as tables, other embodiments of the invention describe various other types of data structures (e.g., trees, tries, linked lists, hybrid, etc.). While it is understood that interfaces may be bidirectional, in this description embodiments of the invention will be described with reference to ingress bridge interface 930B receiving packets and egress bridge interface 930A transmitting packets, in order not to confuse the understanding of the invention. In addition, multiple interfaces may be used according to other embodiments of the invention.

While in one embodiment of the invention circuit attribute table 910 includes fields circuit description, untrusted, and restricted, other embodiments of the invention describe various other fields and/or a combination of fields (e.g., untrusted restricted, untrusted non-restricted, trusted restricted, trusted non-restricted, etc.). Furthermore, while in one embodiment, circuit description in circuit attribute table 910 uniquely identifies circuits based on the slot, port, channel, sub-channel, and context, alternate embodiments may uniquely identify a circuit using some other identification scheme (e.g., circuit identifier, etc.). The untrusted field in circuit attribute 910 identifies whether the circuit is trusted or untrusted. The restricted field in circuit attribute 910 identifies whether the circuit is restricted or unrestricted.

While in one embodiment of the invention bridge forwarding table 912 includes fields circuit description, static station addresses, and dynamic station addresses, other embodiments of the invention describe various other fields and/or a combination of fields. Similar as circuit description for circuit attribute table 910, in one embodiment of the invention circuit description in bridge forwarding table 912 uniquely identifies circuits based on the slot, port, channel, sub-channel, and context, other embodiments of the invention uniquely identifies circuits using some other identification scheme (e.g., circuit identifier, etc.). A special circuit entry in bridge forwarding table 912, called static drop, identifies addresses that should be dropped. The static station addresses field identifies addresses that are statically configured for a particular circuit. In other words, the static station addresses field represents addresses that are manually configured as being assigned with a particular circuit. The dynamic station addresses field identifies addresses that are dynamically configured for a particular circuit.

Packet address lookup module 914 receives packets from ingress bridge interface 930B and looks up addresses of the packet in bridge forwarding table 912, according to one embodiment of the invention. Packet address lookup module 914 passes this information to circuit type lookup module 916 and forwarding decision module 918.

Circuit type lookup module 916 determines types of circuits (e.g., untrusted restricted, untrusted non-restricted, trusted restricted, trusted non-restricted) based on information received from packet address lookup module 914. The type of circuits is passed to forwarding decision module 918.

Forwarding decision module 918 makes packet forwarding decisions based upon packet addresses, the packet input circuit and the information gathered by packet address lookup module 914 and circuit type lookup module 916. Forwarding decision module 918 will either determine to drop the packet or forward the packet through egress bridge interface 930A. As an example, forwarding decision module 918 may drop a packet if packet address lookup module 914 determines that addresses of the packet are assigned to the static drop circuit in bridge forwarding table 912.

Figure 10:
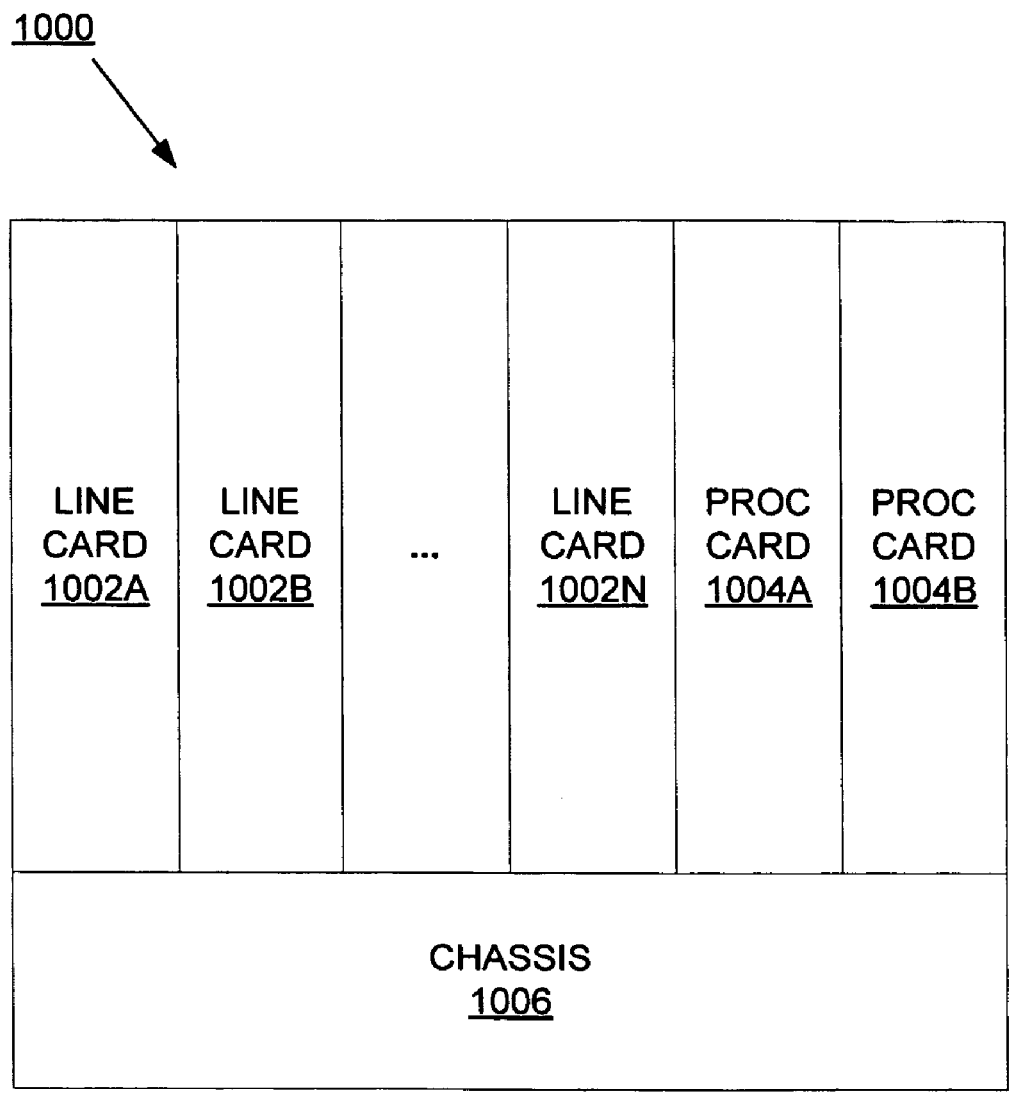
FIG. 10 is a block diagram illustrating one embodiment of an inter-circuit and circuit type security management module.

FIG. 10 is a block diagram of a subscriber management platform incorporating an enhanced layer II bridge, according to one embodiment of the invention. While in one embodiment of the invention chassis 1006 is coupled to line cards 1002A-N and processing cards 1004A-B, other embodiments of the invention describe multiple other devices and/or modules coupled to chassis 1006. While in one embodiment, inter-circuit and circuit type security management module 302 may be in line cards 1002A-N and/or processing cards 1004A-B, alternate embodiments may have alternate card arrangements (a combined line and processing card with one or more ports and a forwarding engine, one processing card per line card, multiple processing card per line card, etc.). Subscriber management platform 1000 includes line cards 1002A-N to forward packets. Subscriber management platform 1000 also includes processing cards 1004A-B to process route changes, to manage subscription information, etc.

This implementation of the inter-circuit and circuit type security management module is an example, and not by way of limitation. Thus, network elements having other architectural configurations can incorporate embodiments of the invention. Examples of other network elements that could incorporate embodiments of the invention could have multiple forwarding cards or have a single line card incorporating the functionality of both the forwarding and the controlling. Moreover, a network element having the forwarding functionality distributed across the traffic cards could incorporate embodiments of the invention.

The traffic cards as well as line cards 1002A-N, and processor cards 1004A-B included in the different network elements include memories, processors and/or Application Specific Integrated Circuits (ASICs). Such memory includes a machine-readable medium on which is stored a set of instructions (i.e., software) embodying any one, or all, of the methodologies described herein. Software can reside, completely or at least partially, within this memory and/or within the processor and/or ASICs. For the purposes of this specification, the term "machine-readable medium" shall be taken to include any mechanism that provides (i.e., stores and/or transmits) information in a form readable by a machine (e.g., a computer). For example, a machine-readable medium includes read only memory (ROM); random access memory (RAM); magnetic disk storage media; optical storage media;

flash memory devices; electrical, optical, acoustical or other form of propagated signals (e.g., carrier waves, infrared signals, digital signals, etc.); etc.

Alternative Embodiments

For example, while the flow diagrams in the figures show a particular order of operations performed by certain embodiments of the invention, it should be understood that such order is exemplary (e.g., alternative embodiments may perform the operations in a different order, combine certain operations, overlap certain operations, etc.)

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, comprising:
  receiving a packet from a first input circuit on a layer II bridging switch, the packet including a source address and a destination address, wherein the source address of the packet has been assigned to a second input circuit; and
  making a forwarding decision for the packet based on at least,
    the source address of the packet being currently assigned to the second input circuit, and,
    the type of that second input circuit, wherein the forwarding decision includes dropping the packet upon determining,
      the first input circuit is untrusted, and
      the source address cannot be reassigned to the first input circuit.

2. A method, comprising:
  receiving a packet from a first untrusted circuit on a layer II bridging switch, the packet including a source address and a destination address;
  dropping the packet upon determining,
    the source address is assigned to a second untrusted circuit and cannot be reassigned to the first untrusted circuit, wherein the source address cannot be reassigned if the first untrusted circuit is restricted; and
  forwarding the packet to the destination address upon determining
    the destination address is assigned to a trusted circuit.

3. A method, comprising:
  receiving a packet from an input circuit on a layer II bridging device, the packet including a source address and a destination address;
  determining if the source address of the packet does not correspond to a device associated with the input circuit using a bridge forwarding table that tracks devices associated with input circuits;
  upon determining the input circuit is a trusted input circuit, forwarding the packet to the destination address; and
  upon determining the input circuit is an untrusted input circuit, restricting network flow of the packet with the layer II bridging device based upon circuit management rules, wherein the restricting includes dropping the packet upon determining the source address of the packet cannot be reassigned to the untrusted input circuit.

4. The method of claim 3 wherein the circuit management rules include dropping the packet if,
  the source address is associated with a first untrusted circuit, and
  the destination address is associated with a second untrusted circuit.

5. The method of claim 3 wherein the circuit management rules include,
  dropping the packet upon determining
    the source address of the packet is marked as static drop.

6. The method of claim 3 wherein the circuit management rules include,
  dropping the packet upon determining
    the destination address of the packet is marked as static drop.

7. The method of claim 3 wherein the circuit management rules include dropping the packet upon determining,
  the input circuit is restricted, and
  the source address is not associated with the input circuit.

8. The method of claim 3 wherein the circuit management rules include dropping the packet if
  the source address of the packet is associated with a trusted circuit.

9. A method for forwarding a packet, comprising:
  receiving the packet from an input circuit, wherein the packet includes a source address and a destination address;
  determining that the source address of the packet does not correspond to a device associated with the input circuit using a bridge forwarding table that tracks devices associated with input circuits:
  dropping the packet if the source and destination addresses are associated with two different untrusted circuits;
  dropping the packet if the input circuit is untrusted and the source address cannot be reassigned to the input circuit; and
  forwarding the packet if the source and destination addresses are respectively associated with untrusted and trusted circuits.

10. The method of claim 9 further comprising dropping the packet upon determining the input circuit is restricted.

11. A layer II bridging switch, comprising:
  a plurality of interfaces to transmit and receive packets over circuits;
  a bridge forwarding table that tracks devices associated with the circuits; and
  an inter-circuit and circuit type security management module to make forwarding decisions for the packets received on at least some a plurality of the circuits, wherein each of the forwarding decisions for a received packet is based on
    a receiving circuit type,
    whether a source address of the received packets is assigned to a circuit different than the receiving circuit using the bridge forwarding table,
    whether the source address of the received packet on an untrusted circuit can be reassigned to that unfrosted circuit, and
    a type of an output circuit associated with a destination address of the received packet.

12. The layer II bridging switch of claim 11 further comprising:
  one or more tables to
    maintain identification of the plurality of circuits, the identification to include whether the plurality of circuits are untrusted or trusted, and
    maintain assignments of addresses to the plurality of circuits;

a packet address lookup module coupled to the one or more tables to examine the one or more tables for the addresses assigned to the plurality of circuits; and a circuit type lookup module coupled to the one or more tables and the packet address lookup module to examine types of the plurality of circuits.

13. A method to forward a packet from an untrusted circuit to a trusted circuit, comprising:

receiving a packet from the untrusted circuit;

upon determining the untrusted circuit is unknown in a bridge table, entering the untrusted circuit into the bridge table, and examining the packet to determine its layer 2 source and destination addresses;

upon determining the layer 2 destination address of the packet is assigned to a different untrusted circuit, dropping the packet;

upon determining the layer 2 source address of the packet is assigned to a different untrusted circuit and the layer 2 source address cannot be reassigned to the receiving untrusted circuit, dropping the packet; and upon determining to not drop the packet, forwarding the packet to the trusted circuit based on the layer 2 destination address of the packet.

14. A method, comprising:

receiving a packet from a first untrusted circuit on a layer II bridging switch, the packet including a source address and a destination address;

dropping the packet upon determining, the source address is assigned to a second untrusted circuit and cannot be reassigned to the first untrusted circuit, wherein the source address cannot be reassigned if the source address is marked as static drop; and forwarding the packet to the destination address upon determining the destination address is assigned to a trusted circuit.

* * * * *

UNITED STATES PATENT AND TRADEMARK OFFICE
CERTIFICATE OF CORRECTION

| | | |
|---|---|---|
| PATENT NO. | : 7,778,250 B2 | Page 1 of 1 |
| APPLICATION NO. | : 11/406961 | |
| DATED | : August 17, 2010 | |
| INVENTOR(S) | : Pang et al. | |

It is certified that error appears in the above-identified patent and that said Letters Patent is hereby corrected as shown below:

In Column 1, Line 5, in Heading, delete "A", before "RELATED".

In Column 14, Line 29, in Claim 9, delete "circuits:" and insert -- circuits; --, therefor.

In Column 14, Line 48, in Claim 11, after "received on" delete "at least some".

In Column 14, Line 56, in Claim 11, delete "unfrosted" and insert -- untrusted --, therefor.

Signed and Sealed this
Eleventh Day of January, 2011

David J. Kappos
*Director of the United States Patent and Trademark Office*